United States Patent
Mandelli et al.

(10) Patent No.: US 12,499,680 B2
(45) Date of Patent: Dec. 16, 2025

(54) METHOD AND SYSTEM FOR ENCODED OPTICAL COMMUNICATION USING A MODULATED LIGHT SOURCE

(71) Applicant: APPLE INC., Cupertino, CA (US)

(72) Inventors: Emanuele Mandelli, Mountain View, CA (US); Sai Harsha Jandhyala, Santa Clara, CA (US); Walter Nistico, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 403 days.

(21) Appl. No.: 17/579,713

(22) Filed: Jan. 20, 2022

(65) Prior Publication Data
US 2022/0139084 A1     May 5, 2022

Related U.S. Application Data

(63) Continuation of application No. PCT/US2020/043925, filed on Jul. 29, 2020.
(Continued)

(51) Int. Cl.
  *G06K 9/00* (2022.01)
  *G06F 3/03* (2006.01)
  (Continued)

(52) U.S. Cl.
  CPC ............ *G06V 20/44* (2022.01); *G06F 3/0325* (2013.01); *G06F 3/0425* (2013.01); *G06V 20/46* (2022.01); *G06V 20/52* (2022.01)

(58) Field of Classification Search
  CPC ...... G06F 3/0325; G06F 3/0425; G06V 20/46
  See application file for complete search history.

(56) References Cited

U.S. PATENT DOCUMENTS 8,295,549 B2   10/2012   Marks et al.
9,405,364 B2   8/2016    Hansen
(Continued)

FOREIGN PATENT DOCUMENTS

CN   104426607 A   3/2015
CN   109544590 A   3/2019
(Continued)

OTHER PUBLICATIONS

European Patent Office (ISA/EP), International Search Report and Written Opinion of the International Searching Authority, International Application No. PCT/US2020/043925, 11 pages, Oct. 19, 2020.

*Primary Examiner* — Molly Wilburn
*Assistant Examiner* — Aidan Keup
(74) *Attorney, Agent, or Firm* — Thompson Hine LLP

(57) ABSTRACT

Various implementations disclosed herein include devices, systems, and methods that obtain information from a first electronic device (e.g., to improve interactions for a CGR environment). In some implementations at a second electronic device having a processor, event camera data is obtained corresponding to modulated light (e.g., light including an information signal in its modulation) emitted by an optical source on the first electronic device and received at an event camera. The second electronic device is able to identify information from the first electronic device based on detecting a modulation pattern of the modulated light based on the event camera data. In some implementations, second electronic device is the same electronic device that has the event camera (e.g., laptop) or a different electronic device that receives the event data (e.g., a server receiving the event data from a laptop computer).

20 Claims, 8 Drawing Sheets

Related U.S. Application Data

(60) Provisional application No. 62/880,183, filed on Jul. 30, 2019.

(51) Int. Cl.
    *G06F 3/042*     (2006.01)
    *G06V 20/40*     (2022.01)
    *G06V 20/52*     (2022.01)

(56)     References Cited

U.S. PATENT DOCUMENTS

| | | |
|---|---|---|
| 2003/0001818 A1 | 1/2003 | Katagiri et al. |
| 2009/0027335 A1 | 1/2009 | Ye |
| 2017/0140509 A1* | 5/2017 | Lee ........................... G06T 5/50 |
| 2018/0309970 A1* | 10/2018 | Gupta ................... G01S 17/894 |
| 2019/0014250 A1* | 1/2019 | Stout ...................... H04N 23/71 |
| 2019/0096068 A1 | 3/2019 | Fontanel et al. |
| 2019/0146598 A1 | 5/2019 | Peri |
| 2019/0179426 A1* | 6/2019 | Ojala ................... G02B 27/017 |
| 2020/0333877 A1* | 10/2020 | Ortiz Egea ............... G06T 7/70 |
| 2021/0279890 A1 | 9/2021 | Mou |

FOREIGN PATENT DOCUMENTS

| | | |
|---|---|---|
| EP | 2716468 A1 | 4/2014 |
| WO | 2018/078607 A1 | 5/2018 |

\* cited by examiner

METHOD AND SYSTEM FOR ENCODED OPTICAL COMMUNICATION USING A MODULATED LIGHT SOURCE

TECHNICAL FIELD

The present disclosure generally relates to systems, methods, and devices for obtaining information from a first electronic device, and in particular, for obtaining event camera data corresponding to modulated light (e.g., light including an information signal in its modulation) emitted by an optical source on the first electronic device and received at a sensor.

BACKGROUND

Radio communications for exchanging data between a first electronic device (e.g., accessories) and a second electronic device (e.g., a host device) over short distances, for example using short-wavelength UHF radio waves requires pairing of the two electronic devices. Further, such radio communications have a relatively low data rate, which can increase latency in communications between the two electronic devices.

SUMMARY

Various implementations disclosed herein include devices, systems, and methods for sending information from one electronic device to another electronic device using modulated light that is detected using an event camera. Some implementations involve obtaining, at a receiving electronic device with an event camera, event camera data indicative of an intensity of received modulated light incident on the event camera. The event camera data is interpreted (e.g., at the receiving electronic device) to identify information sent by a sending first electronic device. In some implementations, the first electronic device is a laptop, stylus, input globe, speaker, TV device, display device, watch, wearable electronics, etc. For example, a stylus may modulate light output from an LED on the tip of the stylus to notify a nearby laptop of the stylus' identity, location, relative location, absolute location in world space, IMU data, movement, pose, or operator actions at the stylus (e.g., button click).

In some implementations at a second electronic device having a processor, event camera data is obtained that corresponds to modulated light emitted by an optical source on the first electronic device. In some implementations, the second electronic device is the electronic device where processing of the event camera data occurs. In some implementations, the second electronic device is the same electronic device that includes the event camera (e.g., laptop). In some implementations, the second electronic device is a different electronic device that receives the event data from an electronic device that has the event camera (e.g. a server receiving the event data from the laptop). The second electronic device identifies information from the first electronic device based on detecting a modulation pattern of the modulated light based on the event camera data.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
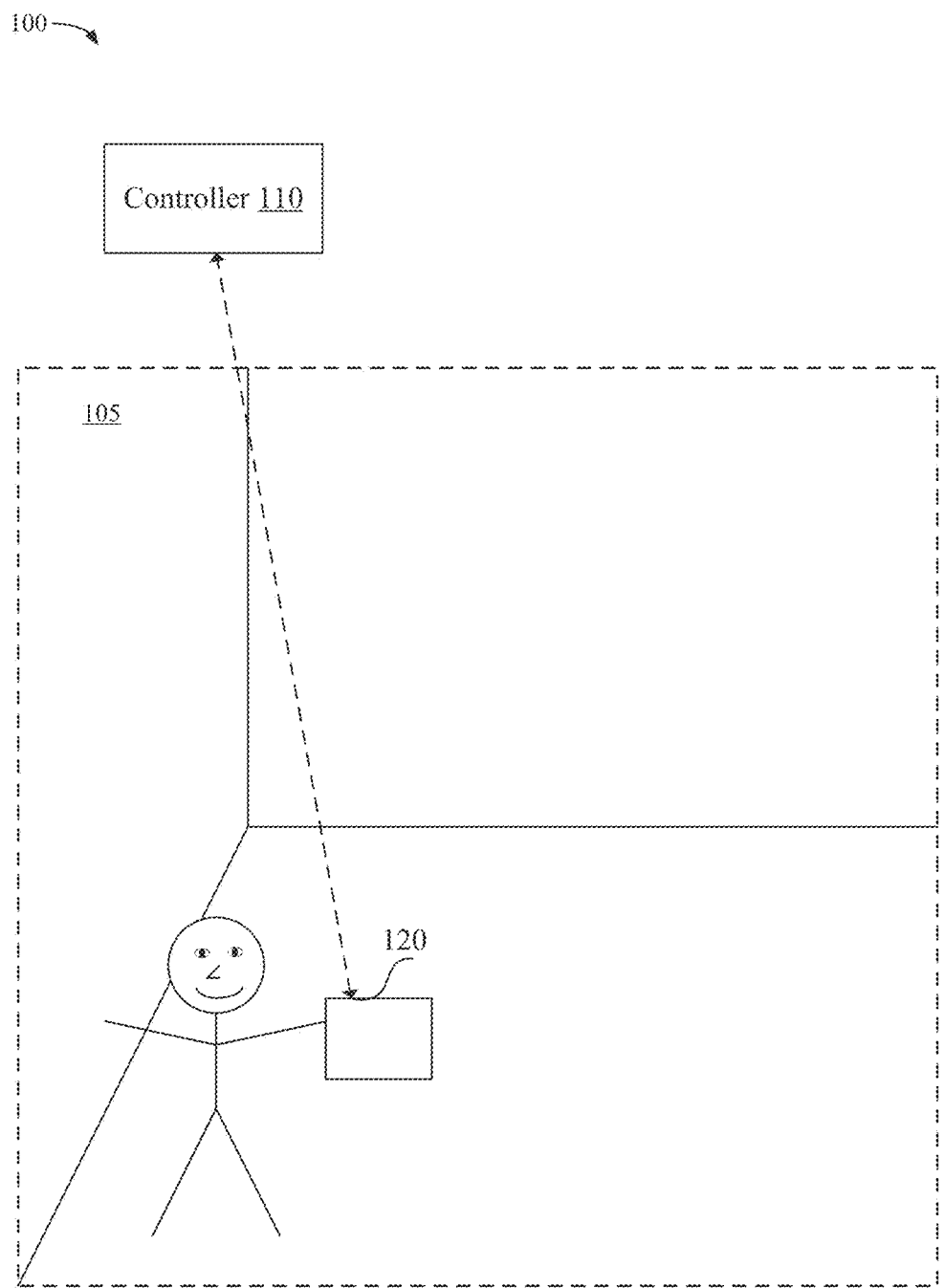
FIG. 1 is a block diagram of an example system in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
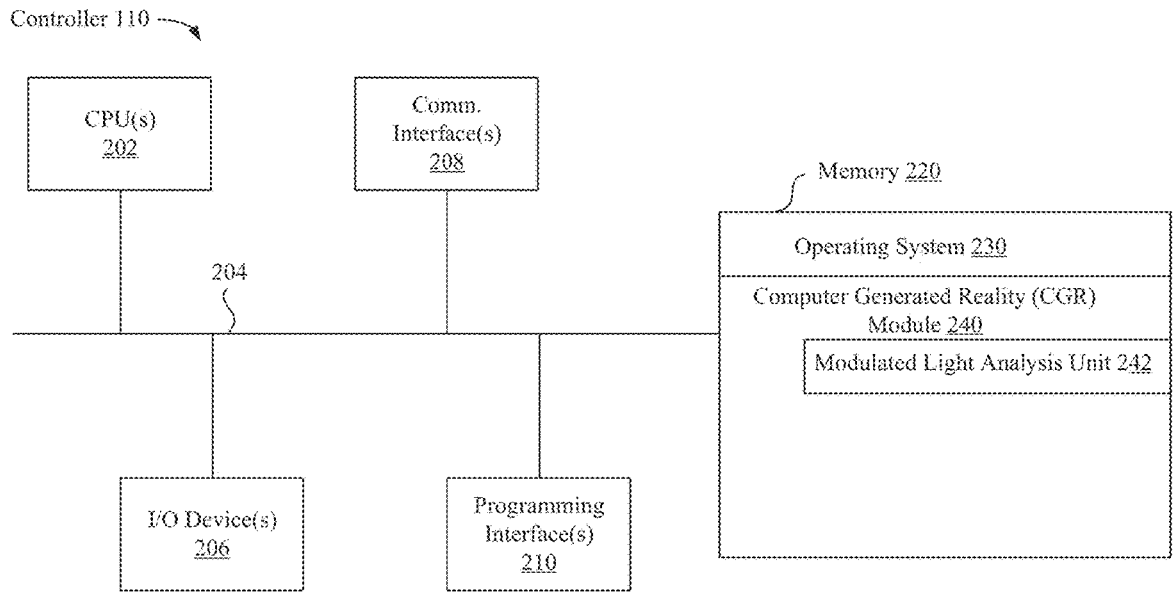
FIG. 2 is a block diagram of an example controller, in accordance with some implementations.
Figure 3:
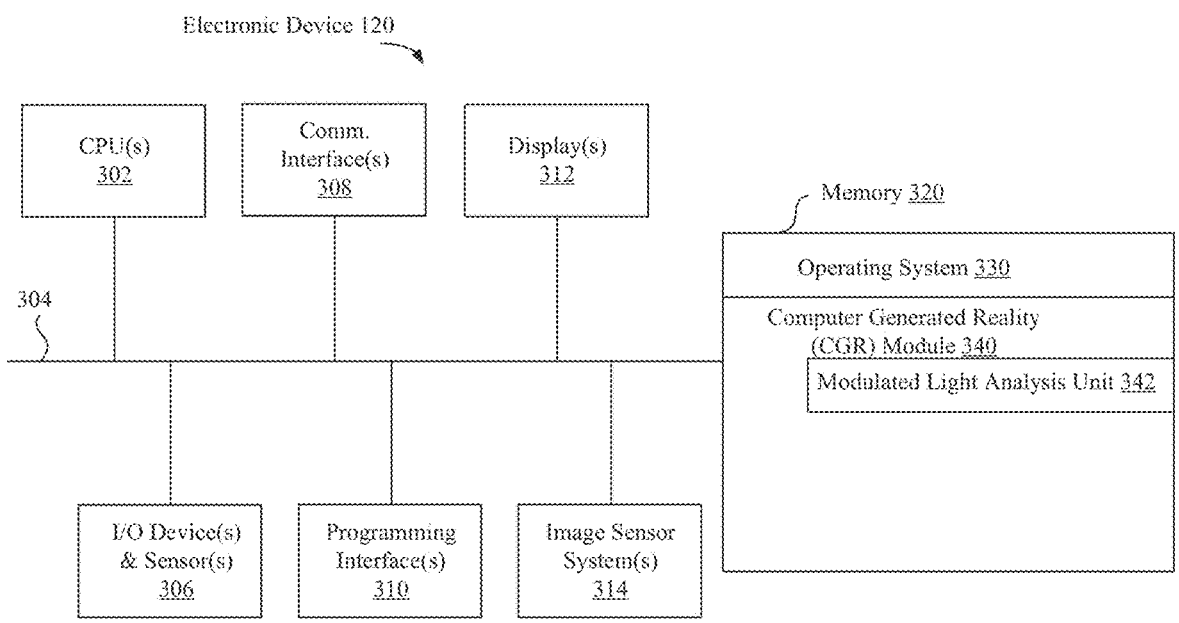
FIG. 3 is a block diagram of an example electronic device, in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving electronic devices including, but not limited to, watches and other wearable electronic devices, mobile devices, laptops, desktops, HMDs, gaming devices, home automation devices, accessory devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device (e.g., laptop) 120, one or all of which may be in a physical environment 105. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to manage and coordinate a computer-generated reality (CGR) environment for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with a corresponding electronic device 120 via one or more wired or wireless communication channels 144 (e.g., BLUETOOTH, IEEE 802.11x, IEEE 802.16x, IEEE 802.3x, etc.).

In some implementations, the controller 110 and a corresponding electronic device (e.g., 120) are configured to present the CGR environment to the user together.

In some implementations, the electronic device 120 is configured to present the CGR environment to the user. In some implementations, the electronic device 120 includes a suitable combination of software, firmware, or hardware. The electronic device 120 is described in greater detail below with respect to FIG. 3. In some implementations, the functionalities of the corresponding controller 110 is provided by or combined with t the electronic device 120, for example, in the case of an electronic device that functions as a stand-alone unit.

According to some implementations, the electronic device 120 presents a CGR environment to the user while the user is present within the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a block diagram of an example of a controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (CGRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and computer-generated reality (CGR) module 240.

The operating system 230 includes procedures for handling various basic system services and for performing hardware dependent tasks.

In some implementations, the CGR module 240 is configured to create, edit, present, or experience CGR environments. The CGR module 240 is configured to present virtual content that will be used as part of CGR environments for one or more users. For example, the user may view and otherwise experience a CGR-based user interface that allows the user to select, place, move, and otherwise present a CGR environment, for example, based on the virtual content location via hand gestures, voice commands, input device inputs, etc. In some implementations, the CGR module 240 includes a modulated light analysis unit 242. The modulated light analysis unit 242 is configured to use modulated light from a sending electronic device that is detected at a receiving electronic device using an event camera. Although these modules and units are shown as residing on a single device (e.g., the electronic device 120), it should be understood that in other implementations, any combination of these modules and units may be located in separate computing devices.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of an electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present a CGR environment to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the electronic device may include a single display. In another example, the electronic device may include a display for each eye of the user.

The memory 320 includes high-speed random-access memory, such as DRAM, CGRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR module 340.

The operating system 330 includes procedures for handling various basic system services and for performing hardware dependent tasks.

In some implementations, the CGR module 340 is configured to create, edit, present, or experience CGR environments. The CGR module 340 is configured to present virtual content that will be used as part of CGR environments for one or more users. For example, the user may view and otherwise experience a CGR-based user interface that allows the user to select, place, move, and otherwise present a CGR environment, for example, based on the virtual content location via hand gestures, voice commands, input device inputs, etc. In some implementations, the CGR module 340 includes a modulated light analysis unit 342. The modulated light analysis unit 342 is configured to use modulated light from a sending electronic device that is detected at a receiving electronic device using an event camera. Although these modules and units are shown as residing on a single device (e.g., the electronic device 120), it should be understood that in other implementations, any combination of these modules and units may be located in separate computing devices.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4:
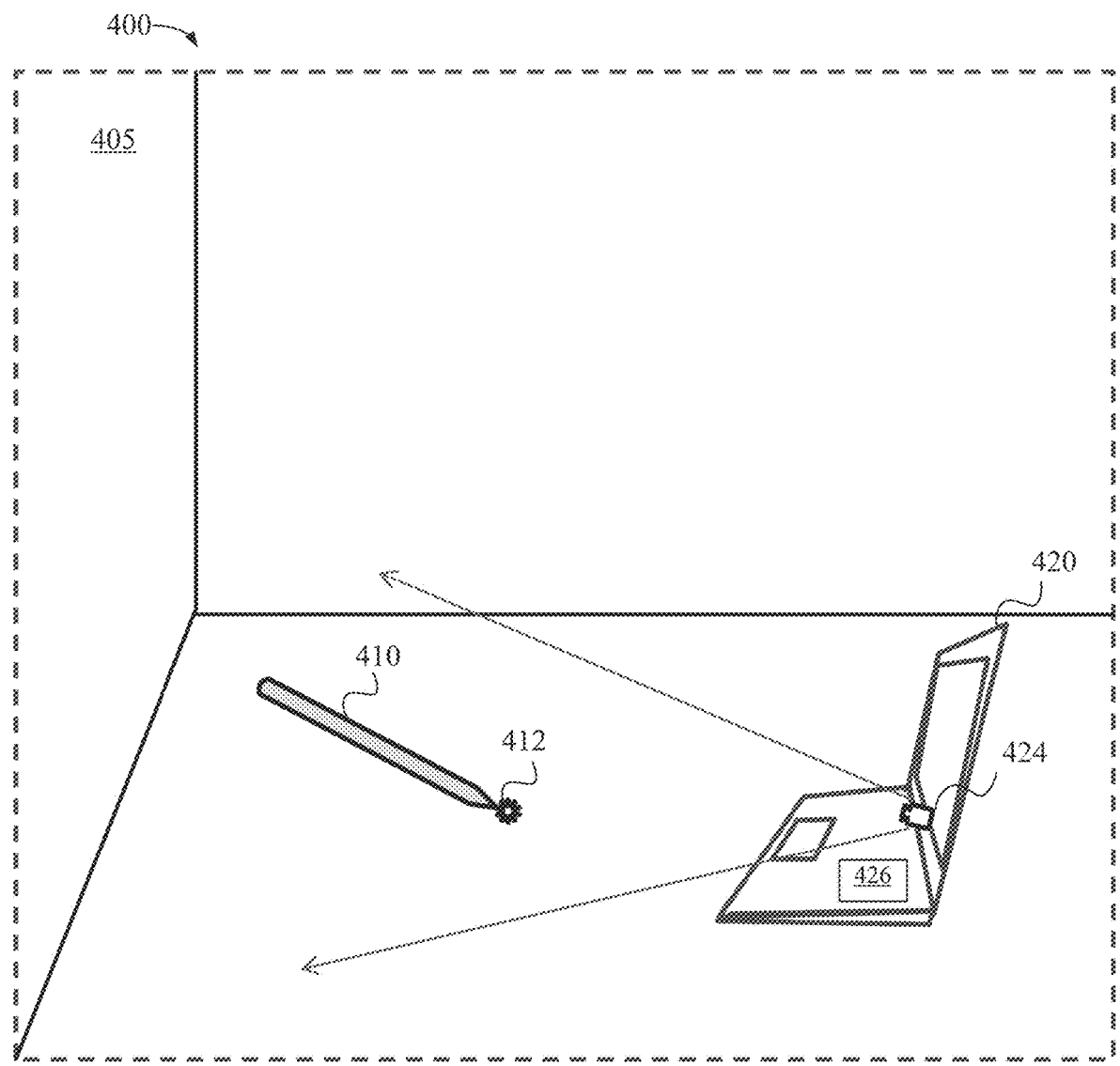
FIGS. 4-6 are block diagrams of various example configurations of event cameras and modulated optical sources distributed among a first electronic device, a second electronic, and a third electronic device in accordance with some implementations.
Figure 5:
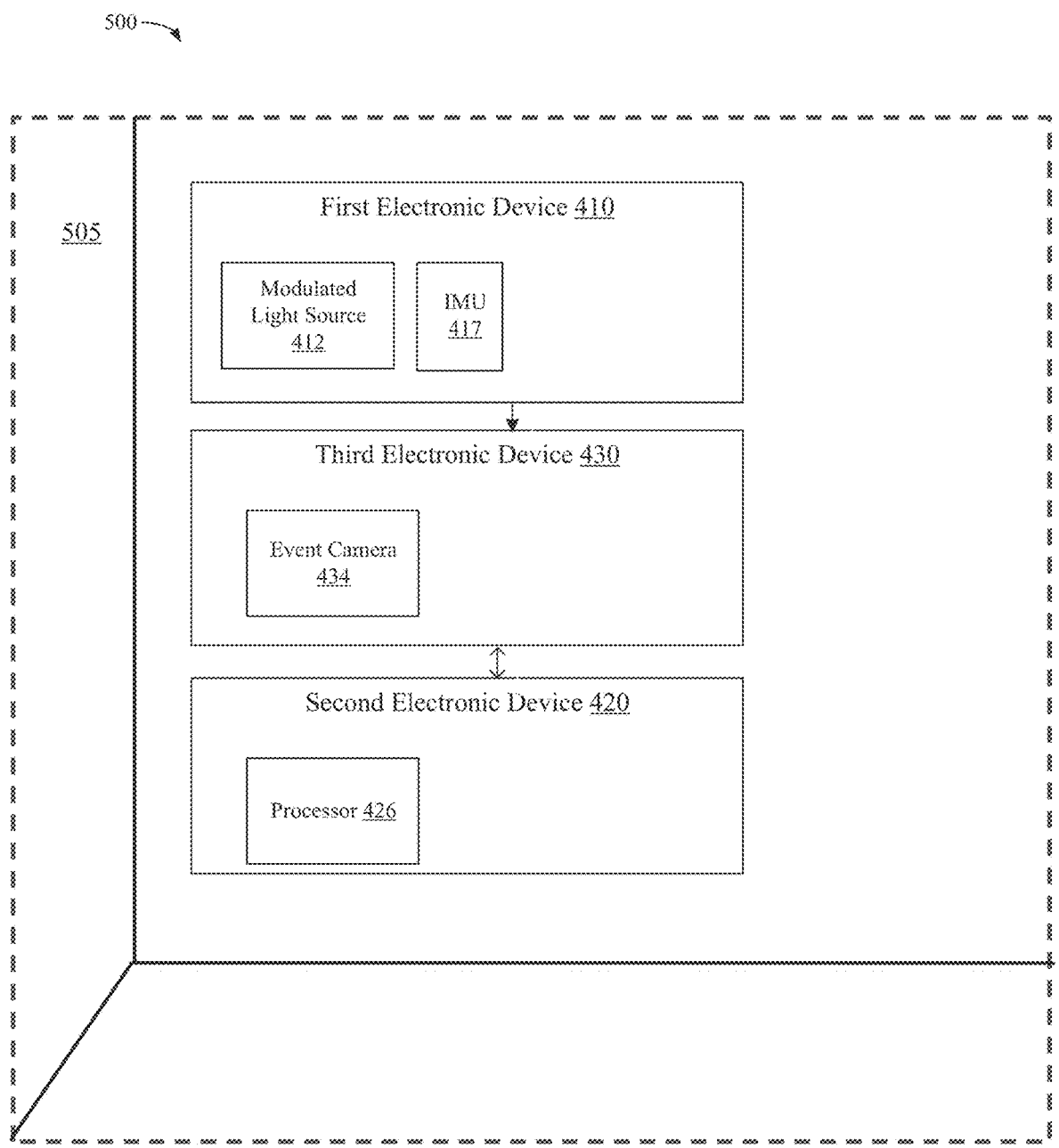
Figure 6:
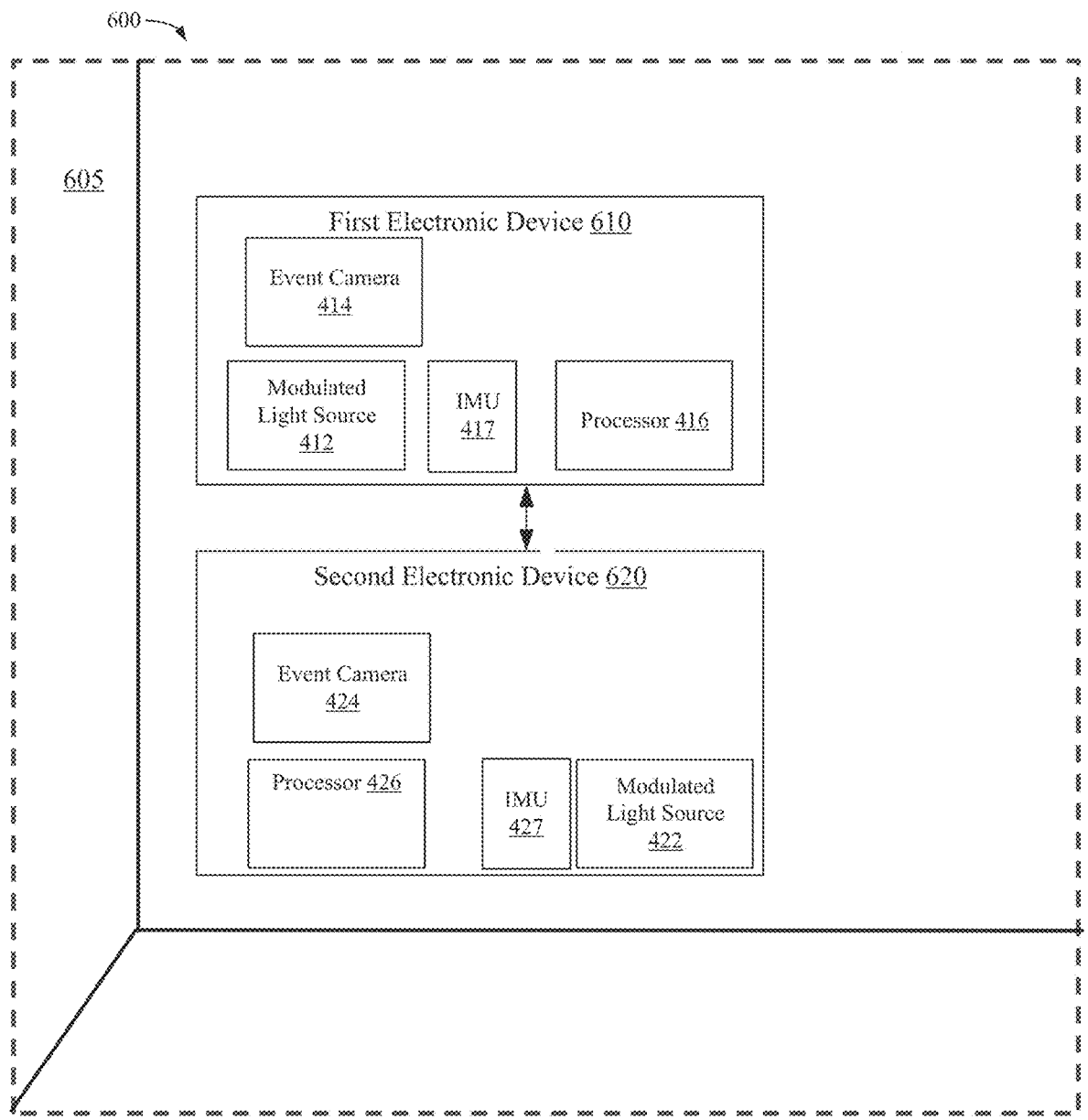

The systems depicted in FIGS. 4-6 provide various example configurations of how event cameras and modulated optical sources may be distributed among a first electronic device, a second electronic, and a third electronic device in accordance with some implementations. FIG. 4 is a block diagram of an example system including a first electronic device communicatively coupled to a second electronic device. As shown in FIG. 4, an example system 400 includes a first electronic device 410 communicatively coupled to a second electronic device 420 in a physical environment 405. In the configuration of FIG. 4, the second electronic device 420 includes an event camera 424 and the first electronic device 410 includes one or more modulated optical sources 412. In some implementations, the modulated light of modulated optical source 412 includes a modulated amplitude (e.g., polarization), phase, or frequency of a radiated light. In some implementations, the event camera 424 is always on because of its low power consumption. In some implementations, the event camera 424 operates at very high frame rates when detecting the modulated light source 412. In some implementations, the event camera 424 detects modulated light faster than 1000 htz. Accordingly, the event camera 424 can reduce latency in communications when detecting modulated light from the modulated light source 412. Further, the second electronic device 420 can smoothly track the first electronic device 410 when using the event camera 424 to detect modulated light from the modulated light source 412.

As shown in FIG. 4, the second electronic device 420 also includes a processor 426 configured to use event camera data output by the event camera 424. In some implementations, the event camera data is a stream of pixel events output by event camera 424 caused by light received from the modulated optical source 412. In some implementations, the processor 426 can use event camera data output by the event camera 424 when detecting light from the modulated optical source 412 to obtain information about or from the first electronic device 410. In obtaining information from the first electronic device 410, the second electronic device 420 can use event camera data corresponding to an information signal encoded by the received modulated light. In addition, the processor 426 can use detection of the modulated light from the modulated optical source 412 to determine information about the first electronic device 410 such as a relative position (e.g., spatial orientation or movement) of the first electronic device 410 in the physical environment 405 or relative to the second electronic device 420.

In some implantations, the first electronic device 410 can be an electronic accessory device capable of encoding information into modulated light output by a modulated light source. In some implementations, the first electronic device 410 is a laptop, stylus, input device, smart speaker, HMD, smart TV, smart watch, wearable electronics, accessory, display device, or the like. As shown in FIG. 4, in some implantations, the first electronic device 410 can be a stylus with a modulated light source 412 at one end. In some implantations, the first electronic device 410 can include more than one modulated light source 412, and the event camera 424 can detect multiple concurrent encoded information from different modulated optical sources. In some implantations, there can be a plurality of different first electronic devices that use different modulation in respective modulated light sources, and the event camera 424 detects multiple concurrent differently encoded information from each of the plurality of different first electronic devices.

In some implantations, the modulated optical source 412 can be an non-directional light source. In some implantations, the modulated optical source 412 is an LED or the like. In some implantations, the modulated optical source 412 operates in a first wavelength range. For example, the modulated optical source 412 can be an infrared (IR) light source. For example, the modulated optical source 412 can be an near-infrared (NIR) light source. For example, the modulated optical source 412 can be a light source emitting in a visible wavelength range. In various implementations, the field of view (FOV) of the event camera 424 and the emission cone of the modulated optical source 412 overlap for the event camera 424 to detect the modulated optical source 412. In some implantations, the event camera 424 is tuned or adapted to detect light in the first wavelength range (e.g., IR). In some implantations, the event camera 424 detects light in a wavelength range larger than the first wavelength range and includes the first wavelength range.

In some implementations, the first electronic device 410 can be different types of accessories. In one implementation, an accessory first electronic device 410 is a 3D input device with a predetermined shape (e.g., manipulatable cube, circular globe; egg-shaped ovoid, etc.) illuminated with modulated light for use in a CGR environment viewable at the second electronic device 420. In this example implementation, operator actions (e.g., button pushes, horizontal or vertical movements, twists, sectional rotations, etc.) at the first electronic device 410 being the input device illuminated with modulated light act user actions into the CGR environment at the second electronic device 420. Further in this example implementation, when the input first electronic device 410 has a predetermined illuminated shape (e.g., dimensions or array of modulated light sources), the second electronic device 420 can determine absolute distances to or rotations of the first electronic device 410 using the spatial position of the received modulated light. In some implementations, modulation with a known pattern can be used as a robust distinct feature of the modulated optical source 412 being detected and tracked. Additionally in this example implementation, when the input first electronic device 410 has a predetermined illuminated shape, the second electronic device 420 can determine absolute distances to or rotations of the first electronic device using the spatial position of the received light in the FOV of the event camera 424 regardless of the light being modulated. In some implementations, a shared CGR environment viewable at the second electronic device 420 can enable concurrent interactions by a plurality of first electronic devices 410 in the shared CGR environment.

In various implementations, modulated-light from the modulated optical source 412 generates events at the event camera 424 by itself (e.g., such events generally have the same frequency as a pulse frequency of the modulated light). However, non-modulated light is effectively "invisible" to the event camera 424 because events are initiated at the event camera 424 only when motion occurs in a part of the physical environment 405 illuminated by non-modulated light (e.g., including movement of the non-modulated light).

FIG. 5 is a block diagram of an example system including the first electronic device, the second electronic, and the third electronic device communicatively coupled together. As shown in FIG. 5, an example system 500 includes the first electronic device 410, the second electronic device 420, and a third electronic device 430 communicatively coupled together in a physical environment 505. As shown in FIG. 5, the first electronic device 410 includes the modulated optical source 412 and an inertial measurement unit ("IMU") 417, and the second electronic device 420 includes the processor 426. As shown in FIG. 5, the third electronic device 430 includes an event camera 434. An IMU is a computing device that provides inertial data by sampling signals generated by one or more sensors of the IMU. The one or more sensors may include one-to-tri-axial accelerometers, one-to-tri-axial axis gyroscopes, one-to-tri-axial magnetometers, barometric pressure sensors, and the like. In some implementations, the processor 426 can use event camera data output by event camera 434 to obtain information from the first electronic device 410. For example, IMU data (e.g., spatial orientation or movement of the first electronic device 410) from the IMU 417 can be encoded and transmitted with modulated light from the modulated optical source 412 detected by the event camera 434. In some implementations, transmission or detection of embedded IMU data is used to track or maintain a status of the first electronic device 410 including XYZ and roll, pitch, yaw (e.g., 6 degrees of freedom), which can be maintained at the second electronic device 420. In addition, the processor 426 can again use detection of the modulated light itself from the modulated optical source 412 to determine a relative position (e.g., spatial orientation or movement) of the first electronic device 410 in the physical environment 505 or with respect to the third electronic device 430 (e.g., the event camera 424).

FIG. 6 is a block diagram of an example system including the first electronic device and the second electronic device. As shown in FIG. 6, an example system 600 includes a first electronic device 610 and a second electronic device 620 communicatively coupled together in a physical environment 605. As shown in FIG. 6, the modulated optical source 412, an event camera 414, a processor 416, and the IMU 417 are disposed on the first electronic device 610, and a modulated optical source 422, the event camera 424, the processor 426, and an IMU 427 are disposed on a second electronic device 620.

As shown in FIG. 6, the second electronic device 620 in the system 600 can include the various capabilities or functions of each of the first electronic device 410 and the second electronic device 420 in the system 400, or each of the first electronic device 410, the second electronic device 420, and the third electronic device 430 in the system 500. Similarly, the first electronic device 610 in the system 600 includes the various capabilities or functions of each of the first electronic device 410 and the second electronic device 420 in the system 400, or each of the first electronic device 410, the second electronic device 420, and the third electronic device 430 in the system 500. In some implementations, the first electronic device 610 and the second electronic device 620 includes other communication channels (e.g. radio waves).

Figure 7:
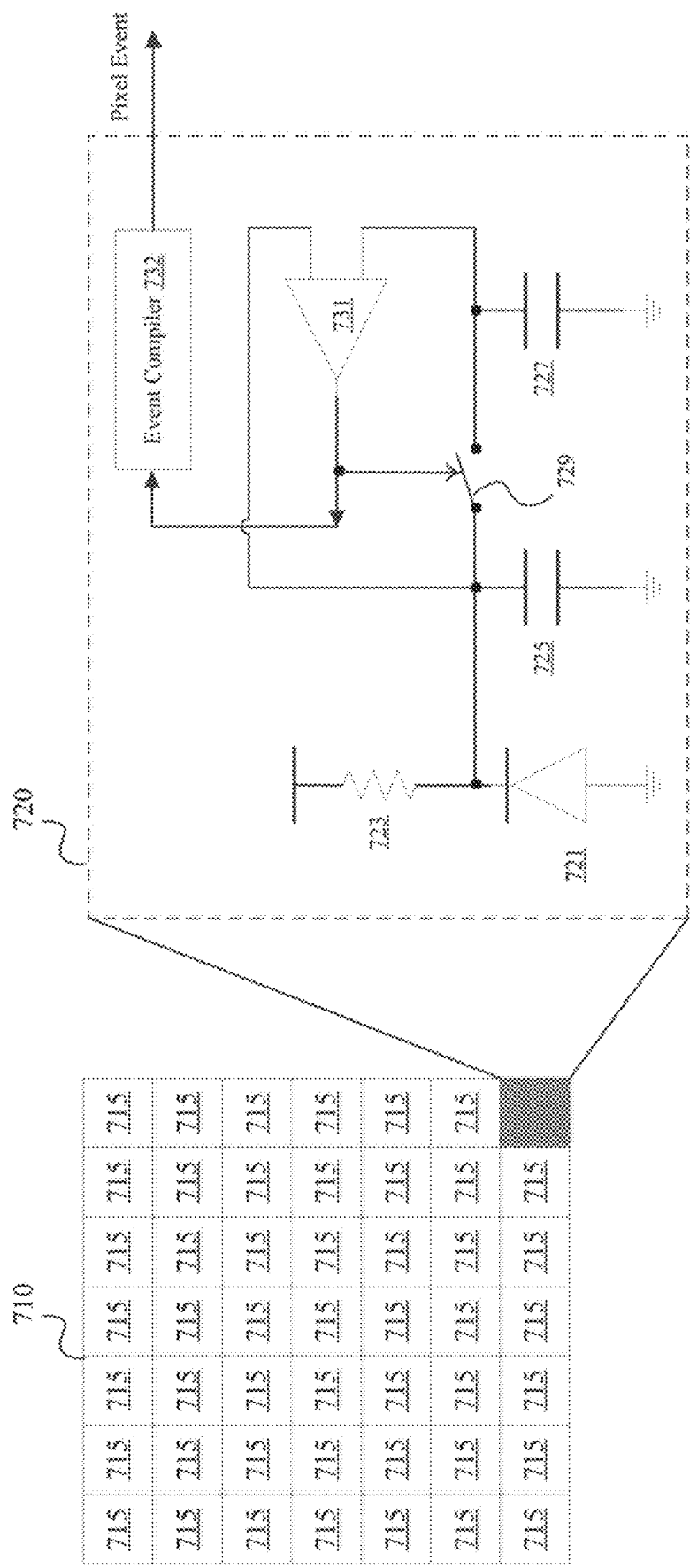
FIG. 7 is a block diagram of pixel sensors for an event camera and an example circuit diagram of a pixel sensor, in accordance with some implementations.

FIG. 7 is a block diagram of pixel sensors for an example event camera and an example circuit diagram of a pixel sensor, in accordance with some implementations. As illustrated by FIG. 7, pixel sensors 715 may disposed on an event camera at known locations relative to an electronic device (e.g., the electronic device 120 of FIG. 1) by arranging the pixel sensors 715 in a 2D matrix 710 of rows and columns. In the example of FIG. 7, each of the pixel sensors 715 is associated with an address identifier defined by one row value and one column value.

FIG. 7 also shows an example circuit diagram of a circuit 720 that is suitable for implementing a pixel sensor 715. In the example of FIG. 7, circuit 720 includes photodiode 721, resistor 723, capacitor 725, capacitor 727, switch 729, comparator 731, and event compiler 732. In operation, a voltage develops across photodiode 721 that is proportional to an intensity of light incident on the pixel sensor. Capacitor 725 is in parallel with photodiode 721, and consequently a voltage across capacitor 725 is the same as the voltage across photodiode 721.

In circuit 720, switch 729 intervenes between capacitor 725 and capacitor 727. Therefore, when switch 729 is in a closed position, a voltage across capacitor 727 is the same as the voltage across capacitor 725 and photodiode 721. When switch 729 is in an open position, a voltage across capacitor 727 is fixed at a previous voltage across capacitor 727 when switch 729 was last in a closed position. Comparator 731 receives and compares the voltages across capacitor 725 and capacitor 727 on an input side. If a difference between the voltage across capacitor 725 and the voltage across capacitor 727 exceeds a threshold amount ("a comparator threshold"), an electrical response (e.g., a voltage) indicative of the intensity of light incident on the pixel sensor is present on an output side of comparator 731. Otherwise, no electrical response is present on the output side of comparator 731.

When an electrical response is present on an output side of comparator 731, switch 729 transitions to a closed position and event compiler 732 receives the electrical response. Upon receiving an electrical response, event compiler 732 generates a pixel event and populates the pixel event with information indicative of the electrical response (e.g., a value or polarity of the electrical response). In one implementation, event compiler 732 also populates the pixel event with one or more of: timestamp information corresponding to a point in time at which the pixel event was generated and an address identifier corresponding to the particular pixel sensor that generated the pixel event.

An event camera generally includes a plurality of pixel sensors like pixel sensor 715 that each output a pixel event in response to detecting changes in light intensity that exceed a comparative threshold. When aggregated, the pixel events output by the plurality of pixel sensor form a stream of pixel events that are output by the event camera. In some implementations, light intensity data obtained from the stream of pixel events output by an event camera is used to determine the changing correspondences between two electronic devices (e.g., the first electronic device 410 and the second electronic device 420). When the event camera is disposed on one device among the first electronic device and the second electronic device (e.g., the first electronic device 610 and the second electronic device 620), at least a portion of the changes in light intensity correspond to light emitted by a plurality of optical sources disposed on the other device among the first electronic device and the second electronic device.

Figure 8:
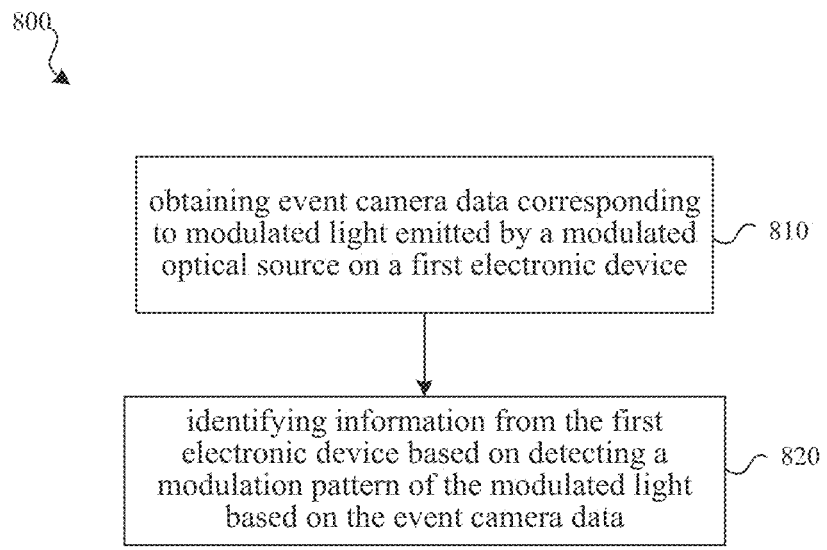
FIG. 8 is a flow-chart illustrating an example of a method of obtaining information from a first electronic device in accordance with some implementations.

FIG. 8 is a flowchart illustrating an exemplary method of obtaining information from a first electronic device according to some implementations. In some implementations, the method 800 is performed by an electronic device (e.g., controller 110 or electronic device 120 of FIGS. 1-3). The method 800 can be performed at a mobile device, HMD, desktop, laptop, server device, or by multiple devices in communication with one another. In some implementations, the method 800 is performed by processing logic, including hardware, firmware, software, or a combination thereof. In some implementations, the method 800 is performed by a processor executing code stored in a non-transitory computer-readable medium (e.g., a memory).

In some implementations, the method 800 operates to obtain information from a first electronic device. In some implementations, the first electronic device is a laptop, stylus, input globe, smart speaker, smart TV, smart watch, wearable electronics, or the like. In various implementations, the method 800 operates at a second electronic device having a processor. In some implementations, the second electronic device includes an event camera (e.g., laptop computer with an event camera). In some implementations, the second electronic is a different electronic device that receives event data from an electronic device that includes the event camera (e.g., a server receiving event data from the laptop computer with an event camera).

At block 810, the method 800 obtains event camera data corresponding to modulated light (e.g., light including an information signal in a modulated signal) emitted by an optical source at the first electronic device. In some implementations, the optical source is one or more LEDs on the first electronic device. In some implementations, the event camera data produced is based on changes in light intensity detected at pixel sensors of an event camera (e.g., the event camera data includes events triggered by changes in light intensity exceeding a comparator threshold in pixel sensors of the event camera).

At block 820, the method 800 identifies information from the first electronic device based on detecting a modulation pattern of the modulated light based on the event camera data. In some implementations, the modulated light includes a modulated amplitude (e.g., modulated polarization), a modulated phase, a modulated frequency or the like. In some implementations, exemplary information identified from the first electronic device includes but is not limited to the first electronic device's identity, the first electronic device's relative location, the first electronic device's absolute location in a 3D spatial coordinate system (e.g., world space, or the physical environment 405), the first electronic device's IMU data, movement of the first electronic device, the first electronic device's pose, button click(s) occurring at the first electronic device, operator actions occurring at the first electronic device or the like.

In some implementations, the modulated light emitted by the optical source or sources at the first electronic device is received at block 810 at the event camera located at the second electronic device. In some implementations, a third electronic device separate from the second electronic device includes the event camera. In some implementations, the modulated light emitted by the optical source or sources at the first electronic device is received at block 810 at the third electronic device and transmitted to the second electronic device. In some implementations, the second electronic device is where processing occurs to implement the method 800.

In some implementations, at block 820 the method 800 determines a location of first electronic device relative to the physical environment or the second electronic device based on the information determined from modulated light from the first electronic device being in the FOV of the event camera. In some implementations, at block 820 the method 800 identifies a movement of the first electronic device relative to the physical environment or the second electronic device. In some implementations, the event camera at the second device is a spatial sensor (e.g., the event camera can locate objects (e.g., movement) through the objects' x, y coordinates on an image sensor plane).

Figure 9:
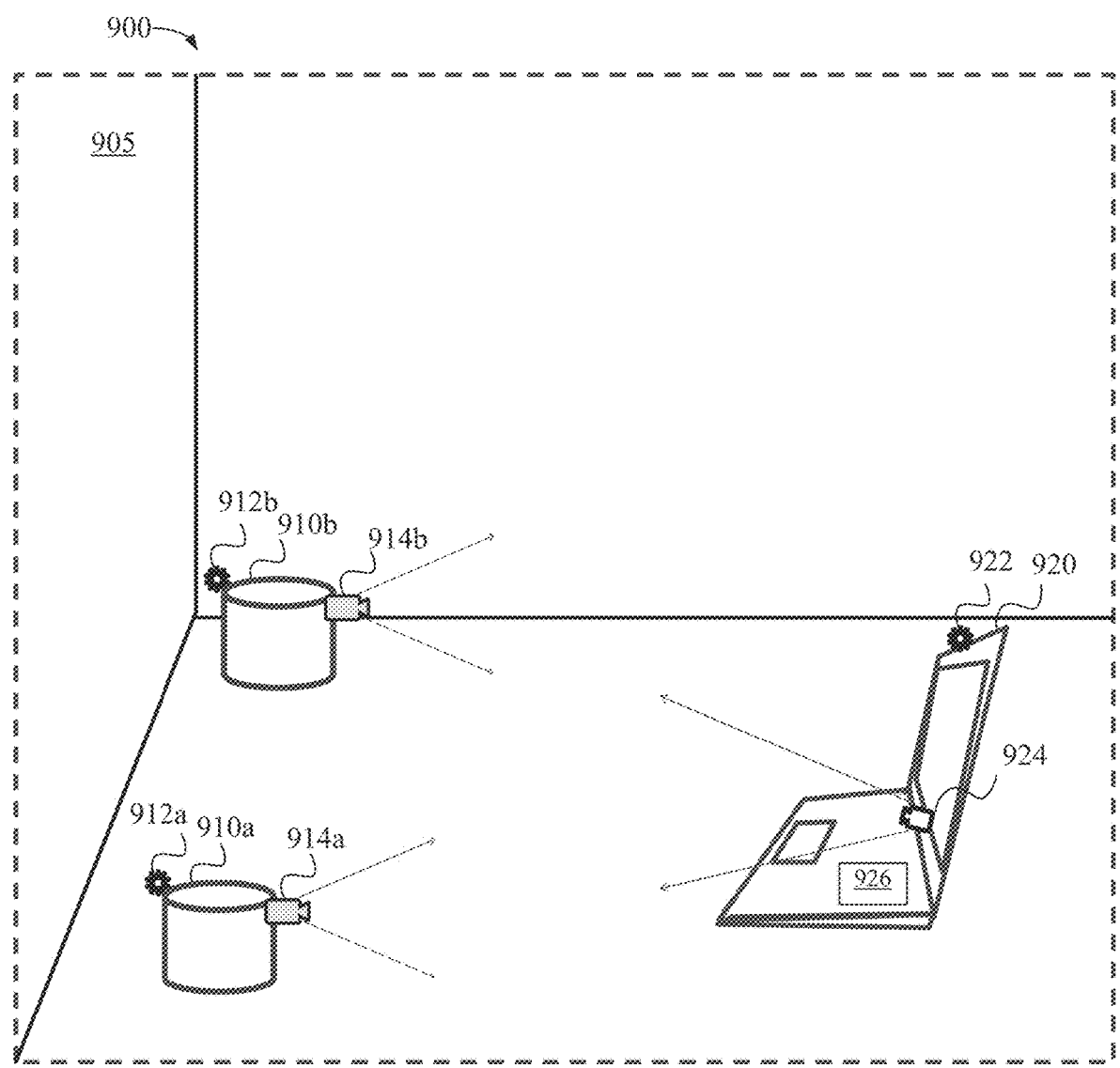
FIG. 9 is a block diagram of an example configuration of a plurality of accessory devices in communication with a host electronic device in accordance with some implementations.

FIG. 9 is a block diagram of an example configuration of a plurality of accessory devices in communication with a host electronic device in accordance with some implementations. As shown in FIG. 9, accessory device 910a using modulated optical source 912a and accessory device 910b using modulated optical source 912b are detected by event camera 924 at host electronic device 920 to provide electronic device localization and identification, and point to point communications (e.g., IMU data and operator actions). As shown in FIG. 9, identical communication capabilities can be optionally implemented bi-directionally by the host electronic device 920 using modulated optical source 922 that is respectively detected by event camera 914a, 914b at the accessory devices 910a, 910b. In some implementations, modulated optical sources 912a, 912b use different modulations (e.g., different frequencies or encoding) for concurrent communications with host electronic device 920.

In one implementation, the first electronic devices 910a, 910b can be smart speakers (or soundbars) variously positioned in a room as the physical environment 905. In this example, when the second electronic device 920 (e.g., host laptop, tablet) enters the room physical environment 905, the accessory speakers 910a, 910b are detected by the host second electronic device 920 using modulated light communications, which allows the accessory speakers 910a, 910b to orient their audio emissions to provide stereo (e.g., surround sound, etc) directed at a current location of the host second electronic device 920. In this example implementation, modulated light communications could be intermittent or periodic (e.g., not continuous) and still provide sufficient audio control.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method of obtaining information from a first electronic device, the method comprising:
   at a second electronic device having a processor;
   obtaining event camera data corresponding to modulated light encoding information emitted by an optical source on the first electronic device and received at an event camera, the event camera data produced based on changes in light intensity of the modulated light detected at pixel sensors of the event camera, wherein the event camera generates pixel events, each respective pixel event only generated in response to a specific pixel sensor within a pixel array of an event sensor detecting a change in light intensity of the modulated light that exceeds a comparator threshold; and
   identifying the information from the first electronic device based on detecting a modulation pattern of the modulated light based on the event camera data, wherein an operator action of the first electronic device is determined based on the information detected in the modulation pattern of the modulated light.

2. The method of claim 1, wherein a location of the first electronic device is determined based on a position of an event camera event in a field of view (FOV) of the event camera.

3. The method of claim 1, wherein a location of the first electronic device is determined based on the information detected in the modulation pattern of the modulated light.

4. The method of claim 1, wherein a location of the first electronic device is determined based on a position of an event camera event in a field of view (FOV) of the event camera and the information detected in the modulation pattern of the modulated light.

5. The method of claim 1, wherein the second electronic device comprises the event camera.

6. The method of claim 1, wherein a third electronic device comprises the event camera, the third electronic device separate from the second electronic device.

7. The method of claim 1, wherein the modulated light comprises a modulated amplitude, phase, or frequency, of a radiated wave.

8. The method of claim 1, wherein the information from the first electronic device identifies a unique identifier of the first electronic device or a device type of the first electronic device.

9. The method of claim 1 further comprising determining a relative location of the first electronic device to the second electronic device based on the information from the first electronic device.

10. The method of claim 1 further comprising determining a location of first electronic device relative a physical environment in three-dimensional (3D) space based on the information from the first electronic device.

11. The method of claim 1, wherein the information from the first electronic device identifies a movement of the first electronic device.

12. The method of claim 1, wherein the information from the first electronic device identifies an input received at the first electronic device.

13. The method of claim 1, wherein the information from the first electronic device provides device recognition and localization of the first electronic device.

14. The method of claim 1, wherein the event camera operates at greater or equal to 1000 frames per second.

15. The method of claim 1, wherein the first electronic device is configured to operate as an input device to the second electronic device.

16. A system comprising:
    a non-transitory computer-readable storage medium; and
    one or more processors coupled to the non-transitory computer-readable storage medium, wherein the non-transitory computer-readable storage medium comprises program instructions that, when executed on the one or more processors, cause the system to perform operations comprising:
       obtaining event camera data corresponding to modulated light encoding information emitted by an optical source on the first electronic device and received at an event camera, the event camera data produced based on changes in light intensity of the modulated light detected at pixel sensors of the event camera, wherein the event camera generates pixel events, each respective pixel event only generated in response to a specific pixel sensor within a pixel array of an event sensor detecting a change in light intensity of the modulated light that exceeds a comparator threshold; and identifying the information from the first electronic device based on detecting a modulation pattern of the modulated light based on the event camera data, wherein an operator action of the first electronic device is determined based on the information detected in the modulation pattern of the modulated light.

17. A non-transitory computer-readable storage medium, storing program instructions computer-executable on a computer to perform operations comprising:

at a second electronic device having a processor;

obtaining event camera data corresponding to modulated light encoding information emitted by an optical source on the first electronic device and received at an event camera, the event camera data produced based on changes in light intensity of the modulated light detected at pixel sensors of the event camera, wherein the event camera generates pixel events, each respective pixel event only generated in response to a specific pixel sensor within a pixel array of an event sensor detecting a change in light intensity of the modulated light that exceeds a comparator threshold; and identifying the information from the first electronic device based on detecting a modulation pattern of the modulated light based on the event camera data, wherein an operator action of the first electronic device is determined based on the information detected in the modulation pattern of the modulated light.

18. The method of claim 1, wherein the information comprises inertial measurement data.

19. The method of claim 1, wherein the information comprises an absolute location of the first electronic device.

20. The method of claim 1, wherein events are initiated at the event camera only when motion occurs within a portion of a physical environment illuminated by non-modulated light.

* * * * *